(12) United States Patent
Perez, Jr. et al.

(10) Patent No.: US 10,453,626 B2
(45) Date of Patent: Oct. 22, 2019

(54) SYSTEMS AND METHODS INCLUDING GATE LOCKOUT UNITS

(71) Applicant: Honda Motor Co., Ltd., Tokyo (JP)

(72) Inventors: Luis M. Perez, Jr., Marysville, OH (US); John Harold Daily, Larue, OH (US); James J. Mercer, Jr., Dublin, OH (US); Ryan Dennis Palmerton, Bellefontaine, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/637,672

(22) Filed: Jun. 29, 2017

(65) Prior Publication Data

US 2019/0006133 A1    Jan. 3, 2019

(51) Int. Cl.
| | |
|---|---|
| *H01H 9/28* | (2006.01) |
| *B25J 15/04* | (2006.01) |
| *B23Q 1/28* | (2006.01) |
| *G07C 9/00* | (2006.01) |
| *F16P 3/08* | (2006.01) |
| *E05B 17/22* | (2006.01) |
| *E05B 13/00* | (2006.01) |
| *E05B 67/38* | (2006.01) |

(52) U.S. Cl.
CPC .............. *H01H 9/283* (2013.01); *B23Q 1/28* (2013.01); *B25J 15/0491* (2013.01); *E05B 13/002* (2013.01); *E05B 17/22* (2013.01); *F16P 3/08* (2013.01); *G07C 9/00944* (2013.01); *E05B 67/383* (2013.01)

(58) Field of Classification Search
CPC ........ H01H 9/283; H01H 9/282; H01H 13/14; H01H 2071/565; H01H 2300/024; H01H 71/04; H01H 71/06; H01H 71/54; H01H 71/58; H01H 73/16; H01H 9/16; H01H 9/20; H01H 9/223; H01H 9/28; H01H 9/286; H01H 9/22; H01H 9/287; H01H 11/0006; H01H 3/36; H01H 71/46; H01H 73/14; H01H 85/25; H01H 9/0066; H01H 9/10; H01H 9/161; H01H 9/162
USPC ........................ 200/43.14, 43.15, 43.19, 43.1
See application file for complete search history.

(56) References Cited

U.S. PATENT DOCUMENTS

| | | |
|---|---|---|
| 4,435,624 A | 3/1984 | Sepulveda |
| 5,341,191 A | 8/1994 | Crookston et al. |
| 5,477,016 A | 12/1995 | Baginski et al. |

(Continued)

*Primary Examiner* — Ahmed M Saeed
(74) *Attorney, Agent, or Firm* — Armstrong Teasdale LLP (HPT)

(57) ABSTRACT

A lockout unit coupled to a gate to provide selective access to an electrical machine is provided. The lockout unit includes a stationary bracket, an arm, and a removable bracket. The stationary bracket includes a first aperture defined therein, and the arm includes a second aperture defined therein. The arm is selectively movable between an open position in which the arm is spaced from the stationary bracket, and a closed position in which the second aperture is substantially concentrically-aligned with the first aperture to receive a locking device therethrough. The removable bracket is selectively coupleable to the arm when the arm is in the closed position. The removable bracket includes a third aperture defined therein that is selectively aligned with one of the first aperture and the second aperture to receive the locking device therethrough when the removable bracket is coupled to the arm.

3 Claims, 7 Drawing Sheets

(56) References Cited

U.S. PATENT DOCUMENTS

| | | | |
|---|---|---|---|
| 6,015,956 A * | 1/2000 | Green | H01H 9/283 200/43.14 |
| 6,160,227 A | 12/2000 | Singer | |
| 6,737,594 B2 | 5/2004 | Helms et al. | |
| 6,791,040 B1 | 9/2004 | Puhalla et al. | |
| 7,148,435 B2 | 12/2006 | Lau et al. | |
| 7,442,888 B2 | 10/2008 | Puddicombe, II et al. | |
| 2002/0139646 A1 | 10/2002 | Karlicek | |
| 2008/0302146 A1 * | 12/2008 | Cannon | E05C 19/003 70/164 |
| 2012/0325628 A1 | 12/2012 | Besana et al. | |

* cited by examiner

SYSTEMS AND METHODS INCLUDING GATE LOCKOUT UNITS

BACKGROUND

The field of the disclosure relates generally to maintenance systems for use with electrical machines, and more particularly, to lockout systems for use in providing selective access to electrical machines.

Electrical machines are machines that use electrical power to perform one or more processes, such as processes used in manufacturing facilities. Such electrical machines are sometimes housed in cages or are installed in separate rooms to prevent operator injuries during operation of the machine. The cages or rooms typically include a door or gate that provides selective access to the machines, such as during maintenance of the electrical machines. For example, a typical cage includes a gate with a latch assembly that includes a handle operatively coupled to a latch bolt. When the gate is closed, the latch bolt extends into a latch strike within the gate or door frame and keeps the gate closed until the handle is moved to an open position, thereby retracting the latch bolt and allowing the gate to be opened.

To prevent potential injuries to maintenance workers and others accessing the cage or room, the cage or room may include a lockout circuit configured to power down the electrical machines within the cage or room when the gate is opened. The electrical machines will not be provided with power until the gate is closed and the latch bolt is extended. Known gates include features that allow the latch assembly to be "locked-open", that is, the latch assembly is physically locked in an open position (i.e., the latch bolt is retracted) so that the lockout circuit cannot be inadvertently placed in a state where the electrical machines are powered while a worker is inside the cage. This may be referred to as "logged out" or "locked out", to prevent inadvertent energization of the equipment. However, in certain situations, for example, upon detection of a malfunction within the lockout circuit, it would be beneficial to be able to physically lock a gate closed. As such, a need exists for improved lockout units that prevent access to machines both during standard operation and/or when the system or lockout unit experiences abnormal operating conditions, such as a malfunction.

BRIEF DESCRIPTION

In one aspect, a lockout unit coupled to a gate to provide selective access to an electrical machine is provided. The lockout unit includes a stationary bracket, an arm, and a removable bracket. The stationary bracket includes a first aperture defined therein, and the arm includes a second aperture defined therein. The arm is selectively movable between an open position in which the arm is spaced from the stationary bracket, and a closed position in which the second aperture is substantially concentrically-aligned with the first aperture to receive a locking device therethrough. The removable bracket is selectively coupleable to the arm when the arm is in the closed position. The removable bracket includes a third aperture defined therein that is selectively aligned with one of the first aperture and the second aperture to receive the locking device therethrough when the removable bracket is coupled to the arm.

In another aspect, a gate lockout system is provided. The gate lockout system includes a gate operable to provide selective access to an electrical machine, and a lockout unit coupled to the gate. The lockout unit includes a stationary bracket including a first aperture defined therein, an arm including a second aperture defined therein, and a removable bracket including a third aperture defined therein. The arm is selectively movable between an open position in which the arm is spaced from the stationary bracket, and a closed position in which the second aperture is substantially concentrically-aligned with the first aperture to receive a locking device therethrough. The removable bracket is selectively coupleable to the arm when the arm is in the closed position. The third aperture is selectively aligned with one of the first aperture and the second aperture to receive the locking device therethrough when the removable bracket is coupled to the arm.

In yet another aspect, a method for preventing access through a gate using a lockout unit coupled to the gate is provided. The lockout unit includes a stationary bracket including a first aperture defined therein, an arm including a second aperture defined therein, and a removable bracket including a third aperture defined therein. The method includes positioning the arm in a closed position in which the lockout unit prevents opening of the gate, coupling the removable bracket to at least one of the arm and the stationary bracket when the arm is in the closed position to align the third aperture with one of the first aperture and the second aperture, and inserting a portion of a locking device through the third aperture and the aligned one of the first aperture and the second aperture to secure the arm in the closed position.

DETAILED DESCRIPTION

Figure 1:
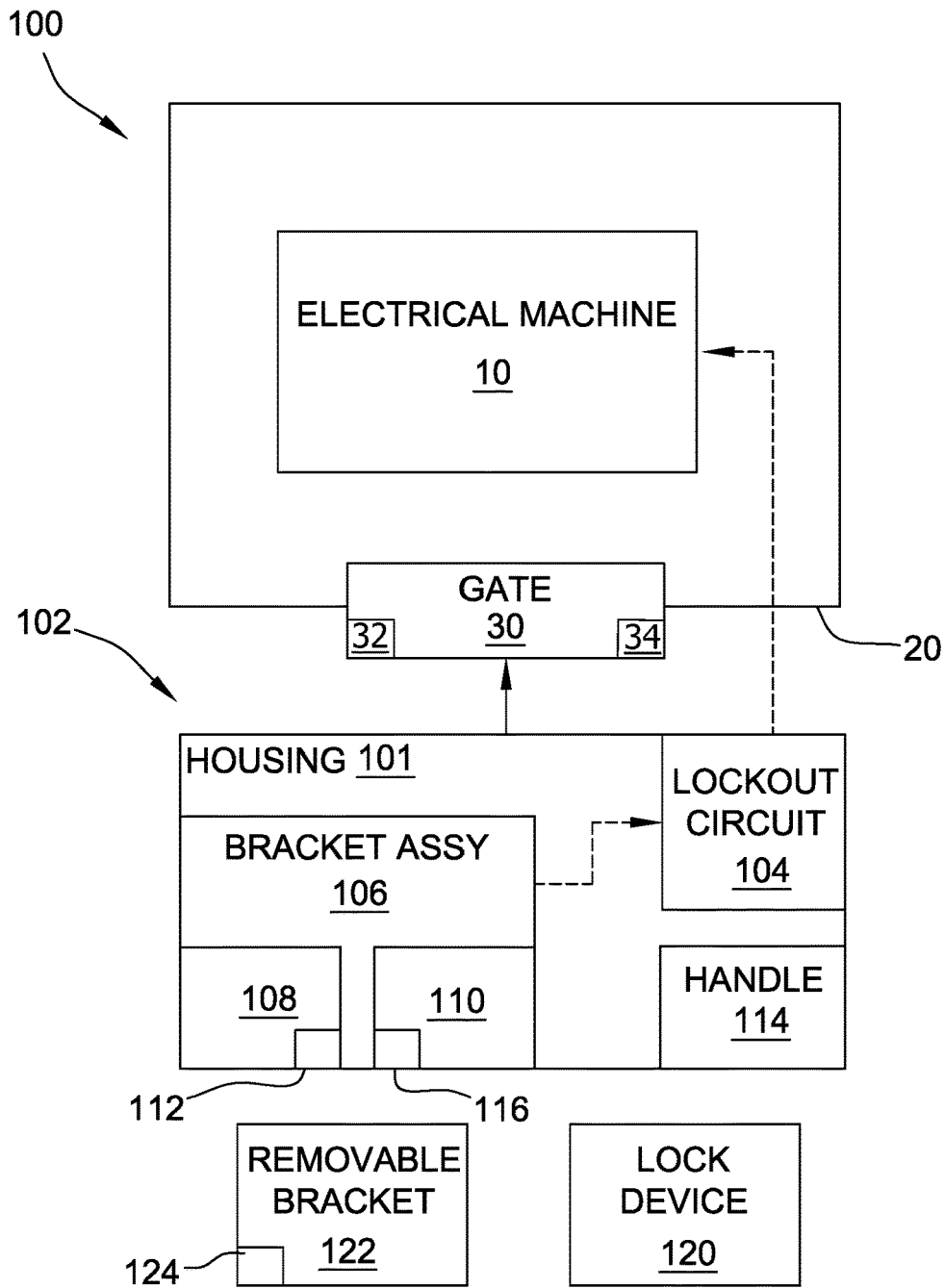
FIG. 1 is a block diagram of an exemplary gate lockout system that may be used to provide selective access to electrical machines.

The systems and methods described herein relate generally to electrical machine cages and lockout units, and more particularly, to methods and apparatus for physically locking a lockout unit in a closed position. As used herein, an "electrical machine" is a machine that uses electrical power to perform one or more processes. In the exemplary embodiment, the electrical machines are automated robots used in manufacturing or industrial processes to facilitate the manufacturing or fabrication of goods (e.g., vehicles). In other embodiments, the electrical machines may be used in different processes or settings.

As used herein, a "normal operating mode," when used with reference to an electrical machine, refers to one or more modes of operation in which the electrical machine performs its intended functionality. In one example, an electrical machine in a manufacturing facility is configured to move, sort, and/or combine components on an assembly line in its normal operating mode. Although only one normal operating mode is described herein, it is to be understood that the electrical machines described herein may have a plurality of normal operating modes.

As used herein, a "maintenance mode," when used with reference to an electrical machine, refers to a mode of operation that enables manual and/or automatic maintenance to be performed on the electrical machine. In one example, the electrical machine is shut down or de-energized, (i.e., substantially no power is provided to the machine) while in the maintenance mode. In another example, at least a portion of the electrical machine's subsystems are shut down and/or are selectively placed in low-power operating modes. In such an example, the mechanical moving parts (e.g., mechanical arms) of the electrical machine may be shut down to prevent potential injuries caused by the moving parts. Although only normal operating and maintenance modes are described herein, it is to be understood that the electrical machine may have other operating modes, such as testing modes.

The systems and methods described herein include a lockout unit that is coupled to a gate associated with an electrical machine. The lockout unit includes a lockout circuit and a bracket assembly. The lockout circuit selectively switches the electrical machine into a maintenance mode, and thereby facilitates improved safety of maintenance workers accessing the electrical machine through the gate. The lockout circuit is electrically coupled to the bracket assembly, and the bracket assembly includes a stationary bracket and an arm that is movable between a closed position and an open position. When the arm is in the open position, the bracket assembly retracts a latch bolt of the gate to open the gate and causes the lockout circuit to switch the electrical machine to the maintenance mode. The stationary bracket and the arm each include a respective aperture. The apertures are only aligned with each other when the arm is in the open position such that a locking device (e.g., a padlock) may be inserted through both apertures, and thereby secure the arm in the open position. In the exemplary embodiment, the bracket assembly also includes a removable bracket that includes an aperture formed therein and at least one non-removable pin. When the arm is in the closed position, the removable bracket is coupled to the arm and/or the stationary bracket such that the aperture of the removable bracket is aligned with the aperture of either the stationary bracket or the arm. A locking device is then used to secure the arm in the closed position, thereby allowing the arm to only be moved to the open position upon removal of the locking device. When the gate is closed, the arm is in the closed position (i.e., the latch bolt extends into a latch strike), and the locking device is coupled to the stationary bracket and the removable bracket. The gate can only be opened upon removal of the locking device. This facilitates preventing access through the gate, such as when the lockout circuit is being repaired or is malfunctioning.

FIG. 1 is a block diagram of an exemplary gate lockout system 100 that may be used to facilitate maintenance being performed on an exemplary electrical machine 10. Machine 10 is operable in at least a normal operating mode and a maintenance mode, and, in the exemplary embodiment, is housed by, or isolated from other areas by one or more walls or cages 20. In the exemplary embodiment, walls 20 extend around machine 10 in any suitable configuration, including configurations that do not completely surround machine 10. In some embodiments, walls 20 are positioned around only a portion of machine 10.

To access machine 10, system 100 includes a gate 30 that is coupled to one or more walls 20. Gate 30 provides selective access to machine 10. That is, gate 30 is selectively repositionable between an open configuration and a closed configuration to provide access to machine 10. In some embodiments, gate 30 is not coupled to walls 20, but rather is coupled directly to a portion of electrical machine 10. In such embodiments, gate 30 may provide selective access to only an internal compartment or portion of machine 10. In at least some embodiments, gate 30 includes one or more handles, levers, knobs, latches, buttons, and/or other suitable mechanisms that facilitate opening and closing gate 30. In the exemplary embodiment, gate 30 includes a latch bolt 32 and a latch strike 34. Latch bolt 32 is configured to selectively extend through or within latch strike 34. In one example, latch bolt 32 is moveable based on a position of a handle associated with gate 30. Latch strike 34 is positioned on a gate or door frame opposite to latch bolt 32 and is configured to secure bolt 32 until bolt 32 is moved by a user (e.g., by rotating the handle). In the exemplary embodiment, when bolt 32 is positioned within or through strike 34, gate 30 is fixed in a closed position. When bolt 32 is retracted or otherwise removed from strike 34, gate 30 is moveable to an open position that provides access within walls 20.

System 100 also includes a lockout unit 102 coupled to gate 30. In some embodiments, lockout unit 102 is integrated within gate 30. In one example, lockout unit 102 is integrated with latch bolt 32. That is, lockout unit 102 includes latch bolt 32. In other embodiments, lockout unit 102 is independent or separate from gate 30. Lockout unit 102 selectively causes machine 10 to switch to the maintenance mode when gate 30 is opened to access machine 10. While in maintenance mode, machine 10 is at least partially powered down to enable a maintenance worker to perform maintenance. After maintenance is completed and all workers are outside of gate 30, lockout unit 102 may selectively switch machine 10 back to the normal operating mode or to a different operating mode.

In the exemplary embodiment, lockout unit 102 includes a housing 101, a lockout circuit 104, and a bracket assembly 106. More specifically, in the exemplary embodiment, lockout circuit 104 and bracket assembly 106 are at least partially enclosed within housing 101. In other embodiments, lockout circuit 104 is a separate component that is external from housing 101. In such embodiments, lockout unit 102 is communicatively and/or electrically coupled to lockout circuit 104.

Lockout circuit 104 is communicatively coupled to machine 10 to selectively switch machine 10 to and from the maintenance mode. Lockout circuit 104 is also electrically and/or communicatively coupled to machine 10 to facilitate switching operating modes of machine 10. In one example, lockout circuit 104 electrically disconnects machine 10 from a power source to switch machine 10 to the maintenance mode. In another example, lockout circuit 104 transmits a signal to machine 10 to cause the operating mode of machine 10 to be switched.

Bracket assembly 106 is electrically and/or mechanically coupled to lockout circuit 104. In the exemplary embodiment, lockout circuit 104 selectively switches operating modes of machine 10 based on bracket assembly 106. More specifically, bracket assembly 106 includes one or more moveable components that cause lockout circuit 104 to selectively switch the operating mode of machine 10 based on a position of the moveable components. In at least some embodiments, bracket assembly 106 includes one or more switches or electrical components (not shown) electrically coupled to lockout circuit 104 that interact with lockout circuit 104 to indicate the position of the moveable components.

Bracket assembly 106 is selectively positionable between an open configuration and a closed configuration. Lockout circuit 104 selectively switches machine 10 to the maintenance mode based on the relative configuration bracket assembly 106 is currently in. For example, in the exemplary embodiment, lockout circuit 104 switches machine 10 to the maintenance mode when bracket assembly 106 is in the open configuration. During use of lockout unit 102, bracket assembly 106 is secured in the open configuration as described herein when a maintenance worker or other user is accessing machine 10. Once access to machine 10 is no longer necessary, bracket assembly 106 is repositioned back to the closed configuration and lockout circuit 104 switches machine 10 to a different operating mode.

In the exemplary embodiment, bracket assembly 106 includes a stationary bracket 108 and an arm 110 that are each coupled to housing 101. Stationary bracket 108 is securely coupled to housing 101 and extends outwardly from housing 101. Stationary bracket 108 includes a first aperture 112 defined therein and sized to receive a portion of a locking device 120 therethrough, as described herein. First aperture 112 extends through a portion of stationary bracket 108.

In the exemplary embodiment, arm 110 is rotatably coupled to housing 101 such that arm 110 is selectively rotatable. More specifically, arm 110 is selectively movable between an open and a closed position. When arm 110 is in the open position, lockout circuit 104 switches machine 10 to the maintenance mode. When arm 110 is in the closed position, lockout circuit 104 switches machine 10 from the maintenance mode to another operating mode. Arm 110 is coupled to a handle 114 that extends from housing 101. Handle 114 enables a user to selectively rotate arm 110 between the open and closed positions. In some embodiments, rotation of handle 114 facilitates opening and/or closing gate 30. In such embodiments, handle 114 is mechanically, electrically, and/or communicatively coupled to a mechanism (e.g., latch bolt 32) of gate 30 that selectively prevents gate 30 from opening. For example, handle 114 may be operatively coupled to latch bolt 32 and configured to selectively move bolt 32 between a position coupled to strike 34 (closed position) and a position uncoupled from strike 34 (open position).

Arm 110 includes a second aperture 116 that is similar to first aperture 112 of stationary bracket 108. In other embodiments, second aperture 116 is sized or shaped differently from first aperture 112. In the exemplary embodiment, first and second apertures 112 and 116 are selectively positionable in substantially concentric alignment with each other when arm 110 is in the open position. In particular, first and second apertures 112 and 116 are substantially concentrically-aligned with each other to enable locking device 120 to be received therethrough. Locking device 120 may be any suitable lock or lock mechanism (e.g., a padlock) that includes a portion (e.g., a shackle or shank) that is insertable through the first and second apertures 112 and 116 to secure stationary bracket 108 and arm 110 together, and to thus maintain arm 110 in the open position until locking device 120 is manually removed. Maintaining arm 110 in the open position prevents arm 110 from inadvertently moving to the closed configuration (e.g., due to vibrations, incorrect positioning by a user, etc.) while a user is accessing machine 10. Alternatively, apertures 112 and 116 may be aligned when arm 110 is in the closed position to receive locking device 120 therein.

In the exemplary embodiment, bracket assembly 106 also includes a removable bracket 122. Removable bracket 122 is removably coupleable to stationary bracket 108 and/or arm 110. In particular, removable bracket 122 is coupled to stationary bracket 108 and/or arm 110 when arm 110 is in the closed position. In other embodiments, removable bracket 122 is only coupled to stationary bracket 108 and/or arm 110 when arm 110 is in the open position. Removable bracket 122 includes a third aperture 124 defined therein that is sized to selectively receive locking device 120. When removable bracket 122 is coupled to stationary bracket 108 and/or arm 110, aperture 124 is aligned with either first aperture 112 or second aperture 116 to enable locking device 120 to be inserted therethrough. After locking device 120 is secured to stationary bracket 108 or arm 110 and removable bracket 122, arm 110 is securely maintained in the closed position until locking device 120 is manually removed. In the exemplary embodiment, fixing arm 110 in the closed position when gate 30 is closed prevents gate 30 from opening. In embodiments in which lockout circuit 104 is unable to switch machine 10 to maintenance mode (e.g., lockout circuit 104 is malfunctioning), securing arm 110 in the closed position provides additional safety to prevent a user or operator from accessing machine 10 while machine 10 is in a normal operating mode.

Figure 2:
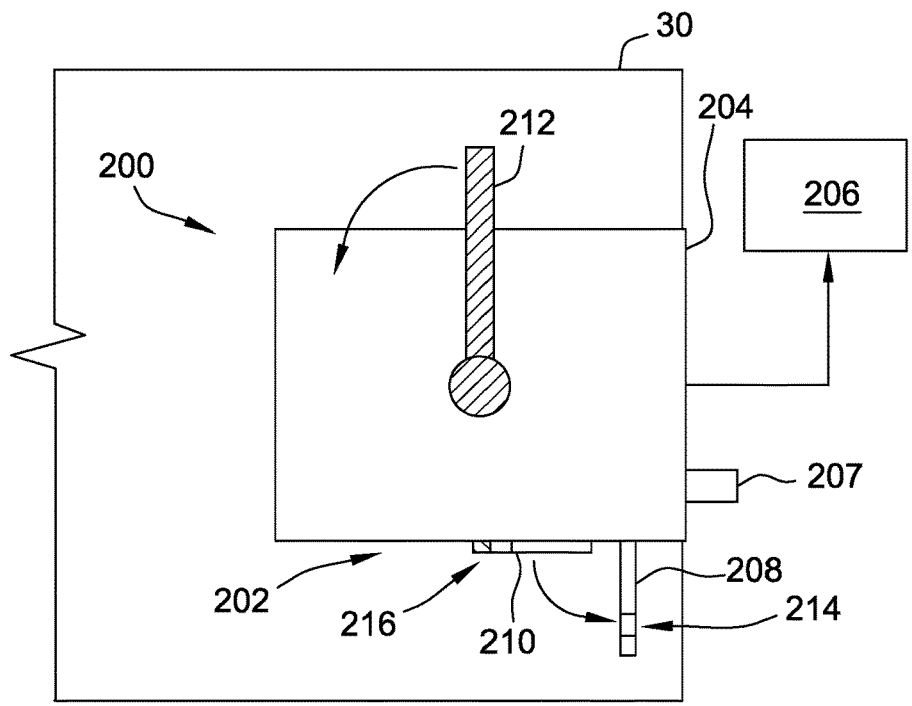
FIG. 2 is a side view of an exemplary lockout unit in a closed configuration and that may be used with the system shown in FIG. 1.
Figure 3:
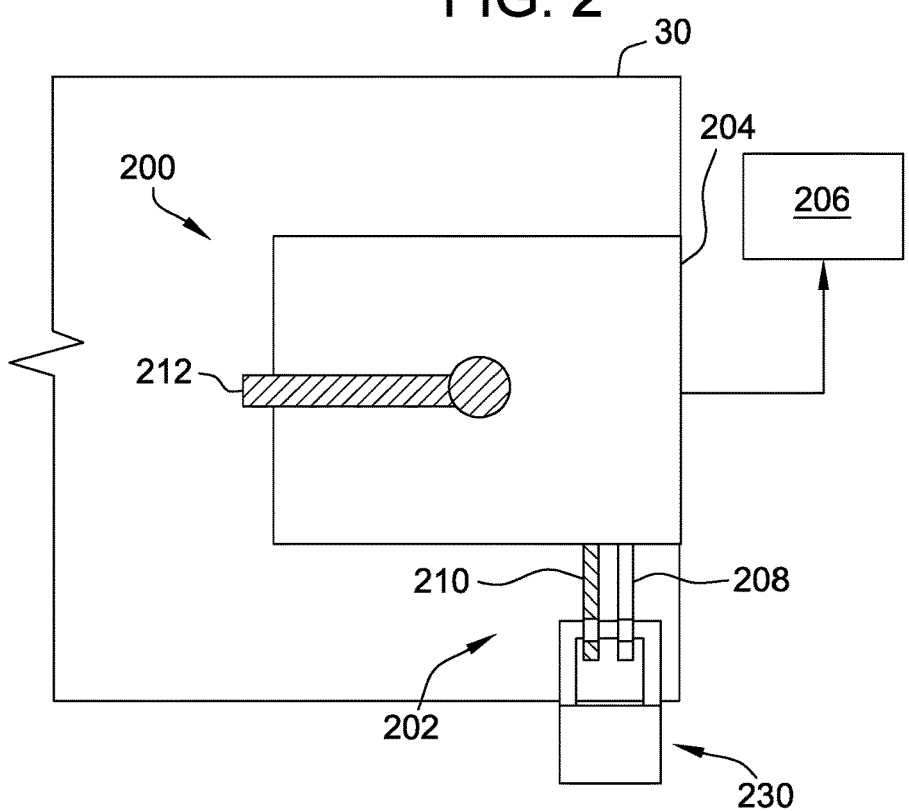
FIG. 3 is a side view of the lockout unit shown in FIG. 2 and an open configuration.
Figure 4:
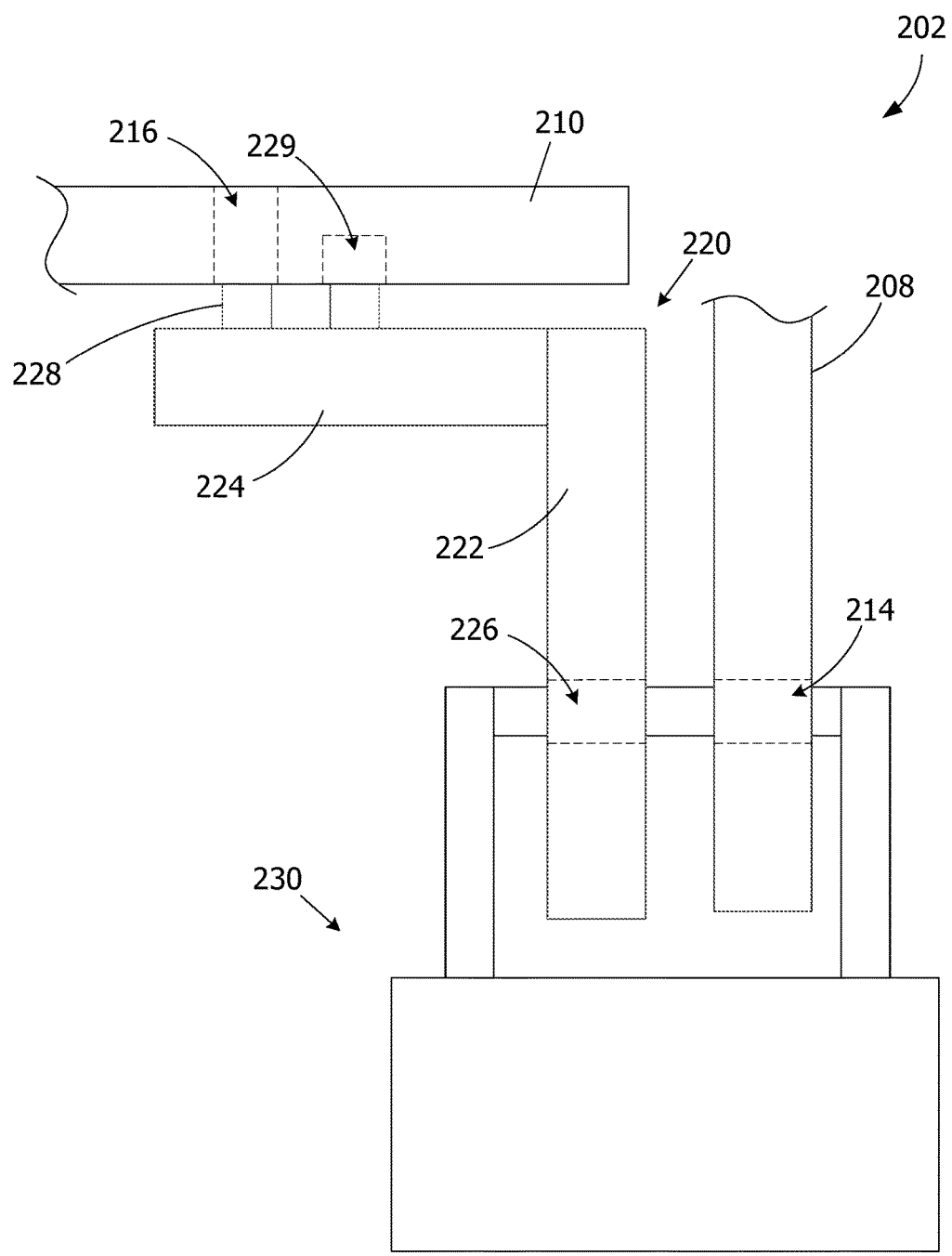
FIG. 4 is a side view of an exemplary bracket assembly that may be used with the system shown in FIG. 1.

FIGS. 2-4 depict an exemplary lockout unit 200 and a bracket assembly 202 of lockout unit 200 that may be used with system 100 (shown in FIG. 1). In particular, FIG. 2 is a side view of lockout unit 200 when bracket assembly 202 is in a closed configuration, FIG. 3 is a side view of lockout unit 200 when bracket assembly 202 is in an opened configuration, and FIG. 4 is a side view of bracket assembly 202 in the closed configuration with a removable bracket coupled thereto. In the exemplary embodiment, lockout unit 200 includes bracket assembly 202, a housing 204, and a lockout circuit 206. In this embodiment, lockout circuit 206 is external from and independent from housing 204. Lockout circuit 206 is electrically coupled to bracket assembly 202 to enable circuit 206 to selectively switch the operating mode of the machine based on the position or configuration of bracket assembly 202. In the example embodiment, lockout unit 200 also includes a latch bolt 207. Latch bolt 207 is configured to selectively move between a retracted position and an extended position (shown in FIG. 2) in which latch bolt 207 extends from housing 204 to engage a corresponding latch strike (not shown in FIG. 2). In other embodiments, unit 200 may include additional, fewer, or alternative components, including those described elsewhere herein.

Bracket assembly 202 includes a stationary bracket 208, an arm 210, and a handle 212. Stationary bracket 208 extends outwardly from housing 204 and is securely coupled to housing 204. Stationary bracket 208 includes a first aperture 214 that extends through stationary bracket 208 and that is sized to selectively receive a locking device 230 therethrough.

Arm 210 is selectively rotatable between a closed position (FIG. 2) and an open position (FIG. 3) relative to housing 204 and stationary bracket 208. Arm 210 is coupled to handle 212, and is rotatable between the open and closed positions using handle 212. Arm 210 includes a second aperture 216 defined therein that is similar to first aperture 214 of stationary bracket. That is, second aperture 216 is sized and shaped to receive locking device 230 therethrough. In the exemplary embodiment, when arm 210 is in the closed position, arm 210 is spaced a distance from stationary bracket 208. When arm 210 is in the open position, arm 210 is positioned adjacent to stationary bracket 208, and apertures 214 and 216 are substantially concentrically-aligned with each other to receive locking device 230 therein and thereby secure arm 210 in the open position.

When the electrical machine (e.g., machine 10, shown in FIG. 1) is operating in a normal operating mode, arm 210 is in the closed position. Lockout unit 200 inhibits or prevents opening of the gate (e.g., gate 30) when arm 210 is in the closed position. Rotation of handle 212 and arm 210 to the open position enables the gate to be opened to provide access to the electrical machine (e.g., machine 10). For example, handle 212 may be operatively coupled to latch bolt 207 such that rotating handle 212 to the open position causes latch bolt 207 to move to the retracted position and disengage the corresponding latch strike, thereby enabling the gate to be opened. When arm 210 is positioned in the open configuration, lockout circuit 206 switches the machine to a maintenance mode. A locking device 230 can then be inserted through apertures 214 and 216 of stationary bracket 208 and arm 210, respectively, to secure arm 210 in the open configuration and to prevent arm 210 from moving to the closed position. While arm 210 is in the open configuration, the machine remains in the maintenance mode, thereby facilitating access by a maintenance worker or other user to the machine.

To return arm to the closed position, locking device 230 is unlocked and manually removed from apertures 214 and 216 to enable rotation of arm 208. Handle 212 is then rotated back to its original position to cause arm 210 to be repositioned to the closed position. In the exemplary embodiment, lockout circuit 206 selectively switches the machine from the maintenance mode to a different operating mode (e.g., the normal operating mode) in response to arm 210 rotating to the closed position. Additionally, in this embodiment, when handle 212 is rotated to the closed position, latch bolt 207 moves from the retracted position to the extended position to engage a corresponding latch strike (not shown in FIG. 2) and maintain the gate in a closed position.

In the exemplary embodiment, bracket assembly 202 also includes a removable bracket 220 (shown in FIG. 4) that is selectively coupleable to stationary bracket 208 and arm 210. In other embodiments, bracket 220 is selectively coupleable to only one of stationary bracket 208 or arm 210. Removable bracket 220 includes a first body portion 222 and a second body portion 224. First body portion 222 includes a third aperture 226 defined therein that is similar to apertures 214 and 216 of stationary bracket 208 and arm 210, respectively. That is, third aperture 226 is sized and shaped to receive locking device 230 therethrough. Third aperture 226 is defined on first body portion 222 such that third aperture 226 may be aligned with either first aperture 214 of stationary bracket 208 or second aperture 216 of arm 210 when removable bracket 220 is coupled to stationary bracket 208 or arm 210, and arm 210 is in the closed configuration. In at least some embodiments, removable bracket 220 includes a retaining member (not shown in FIGS. 2-4) that slidably couples to stationary bracket 208 or arm 210. In some embodiments, for example, the retaining member and first body portion 222 define a retaining opening that receives either stationary bracket 208 or arm 210 therein to secure removable bracket 220 to stationary bracket 208 and/or arm 210.

Second body portion 224 includes a pair of pins 228 that extend perpendicular to second body portion 224. In the exemplary embodiment, pins 228 are coupled to arm 210 such that second body portion 224 is substantially parallel to arm 210. More specifically, arm 210 receives pins 228 within aperture 216 and a pin channel 229 defined therein. In the exemplary embodiment, pin channel 229 extends through a portion of arm 210 parallel to aperture 216. Alternatively, pins 228 may be coupled to stationary bracket 208 such that second body portion 224 is substantially parallel to stationary bracket 208 and first body portion 222 is substantially parallel to arm 210. In other embodiments, a different number of pins 228 (including one) may be used to couple removable bracket 220 and stationary bracket 208 or arm 210 together. In such embodiments, stationary bracket 208 or arm 210 include a corresponding number of pin channels 229 (including none if removable bracket 220 includes only one pin 228) defined therein. Alternatively, any other suitable means of connecting removable bracket 220 and stationary bracket 208 or arm 210 together may be used, such as welding, hooks, latches, and the like.

In the exemplary embodiment, when arm 210 is moved to the closed position, removable bracket 220 is coupled to arm 210, and thus maintains arm 210 in the closed position. Maintaining arm 210 in the closed position prevents an associated gate from opening and facilitates improved safety for users attempting to access the electrical machine. Pins 228 are removably coupled to arm 210 and third aperture 226 is aligned with first aperture 214 of stationary bracket 208. In some embodiments, a retaining member of removable bracket 220 receives stationary bracket 208 within a retaining opening. Locking device 230 is received by apertures 214 and 226 to secure arm 210 in the closed position until locking device 230 is removed.

Figure 5:
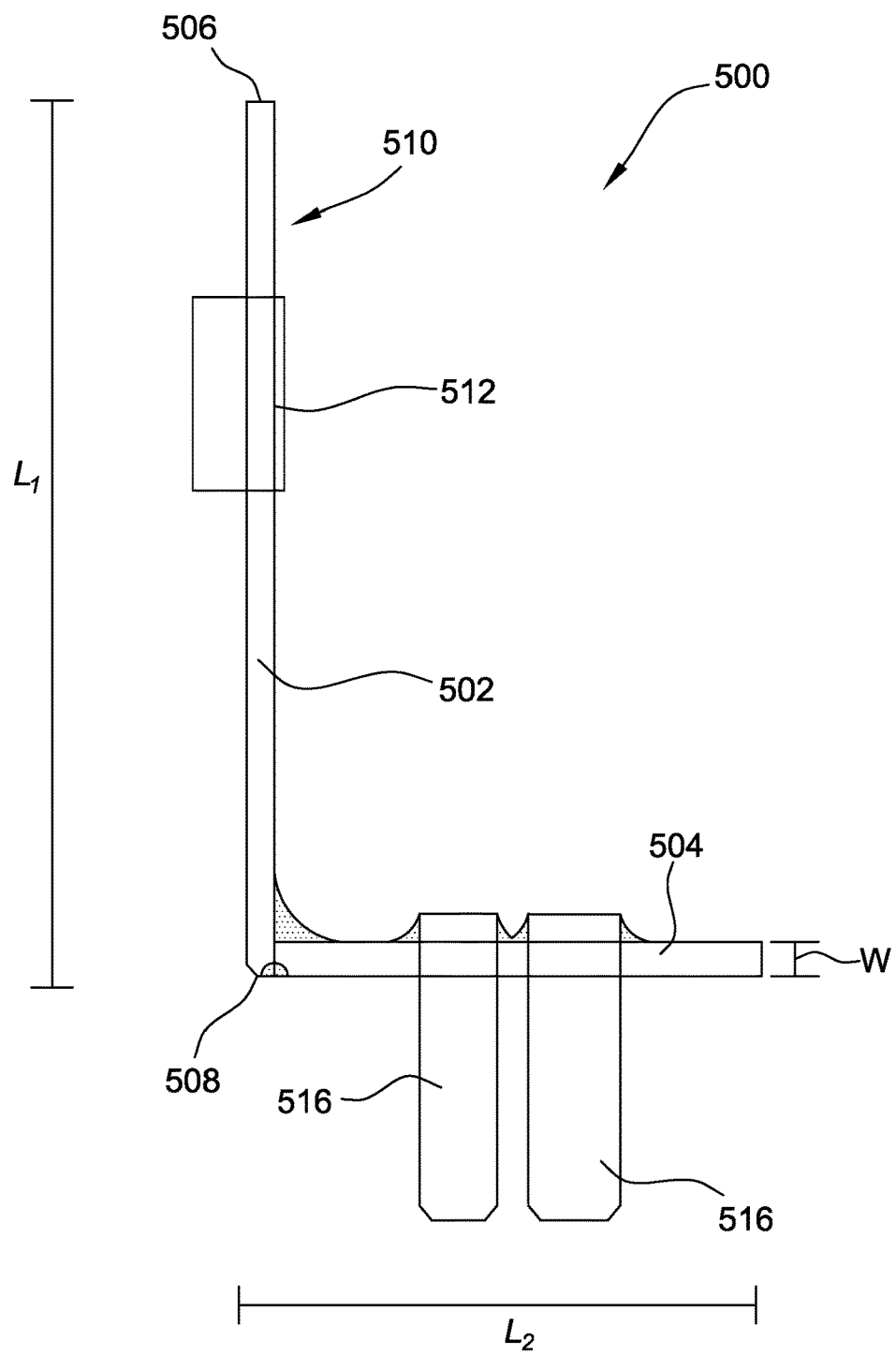
FIG. 5 is a side view of an exemplary bracket that may be used with the system shown in FIG. 1.
Figure 6:
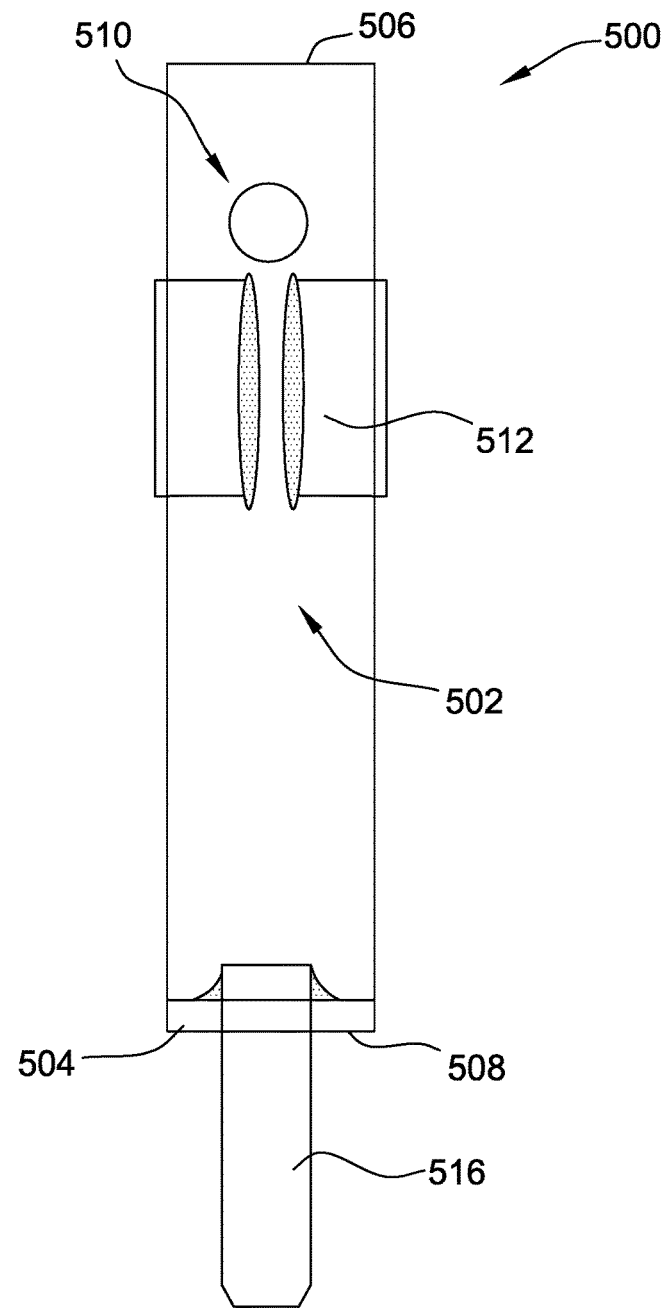
FIG. 6 is a bottom view of the bracket shown in FIG. 5.
Figure 7:
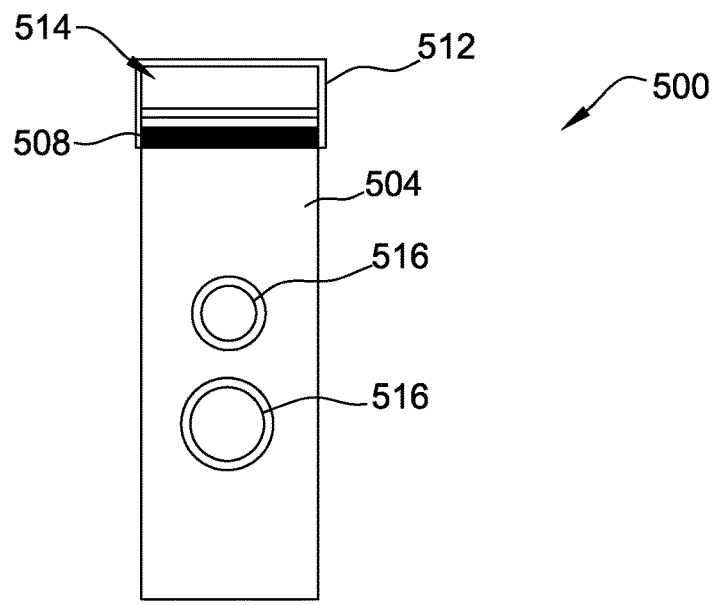
FIG. 7 is a front view of the bracket shown in FIG. 5.
Figure 8:
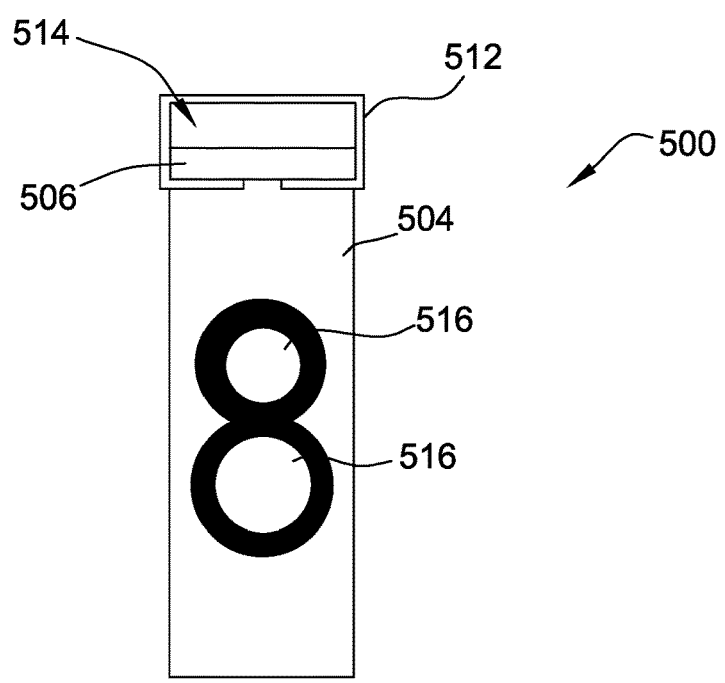
FIG. 8 is a rear view of the bracket shown in FIG. 5.

FIGS. 5-8 depict an exemplary removable bracket 500 that may be used with system 100 shown in FIG. 1. In particular, FIG. 5 is a side view of bracket 500, FIG. 6 is a bottom view of bracket 500, FIG. 7 is a front view of bracket 500, and FIG. 8 is a rear view of bracket 500.

With respect to FIGS. 5-8, bracket 500 is an L-shaped bracket. In other embodiments, bracket 500 is a different shape. Bracket 500 includes a first body portion 502 and a second body portion 504 that extends substantially perpendicular to first body portion 502. First body portion 502 has a first length $L_1$ and second body portion 504 has a second length $L_2$. In the exemplary embodiment, the first length $L_1$ is greater than the second length $L_2$. In other embodiments, the first length $L_1$ may be equal to or less than the second length $L_2$. First and second body portions 502 and 504 have the same width W. In other embodiments, the widths of first and second body portions 502 and 504 may be different.

First body portion 502 has a distal end 506 and a proximal end 508. In the exemplary embodiment, first body portion 502 is joined to second body member 504 at proximal end 508. First body portion 502 includes aperture 510 defined therein and extending through first body portion 502, and a retaining member 512. Aperture 510 is sized and shaped to receive a portion of a locking device, such as a padlock, therein to secure bracket 500 relative to stationary bracket 108 or arm 110 (shown in FIG. 1). In the exemplary embodiment, retaining member 512 is a collar that, together with first body portion 502, defines an opening 514 sized and shaped to receive each of stationary bracket 108 and arm 110 therein. Thus, in the exemplary embodiment, retaining member 512 is slidably coupleable to stationary bracket 106 and/or arm 110 to maintain bracket 500 in a substantially fixed position relative to the coupled stationary bracket or arm. In other embodiments, retaining member 512 may be a retaining member other than a collar. Further, in some embodiments, opening 514 may be sized and shaped to receive only one of bracket 108 and arm 110 therein.

In one embodiment, when a lockout unit including bracket 500 is assembled and bracket 500 is attached to an arm of the lockout unit, a distal end of the stationary bracket is received within opening 514. After the stationary bracket is within opening 514, retaining member 512 maintains the position of bracket 500 relative to the stationary bracket to permit a locking device (not shown in FIG. 5) to extend through aperture 510 and an aperture of the stationary bracket. Alternatively, retaining member 512 is slidably coupled to an arm to maintain the position of bracket 500 relative to the arm.

Second body portion 504 includes two pins 516 that extend perpendicular to second body portion 504 and opposite of first body portion 502. In other embodiments, second body portion 504 includes a different number of pins 516. Pins 516 are fixedly and non-removably coupled to second body portion 504. In other embodiments, pins 516 are removably coupled to second body portion 504. Pins 516 are removably coupled to a stationary bracket or arm of a bracket assembly. In some embodiments, pins 516 include one or more features that facilitate removably coupling to the stationary bracket or the arm, such as hooks, grooves, radially extending members, and the like.

Figure 9:
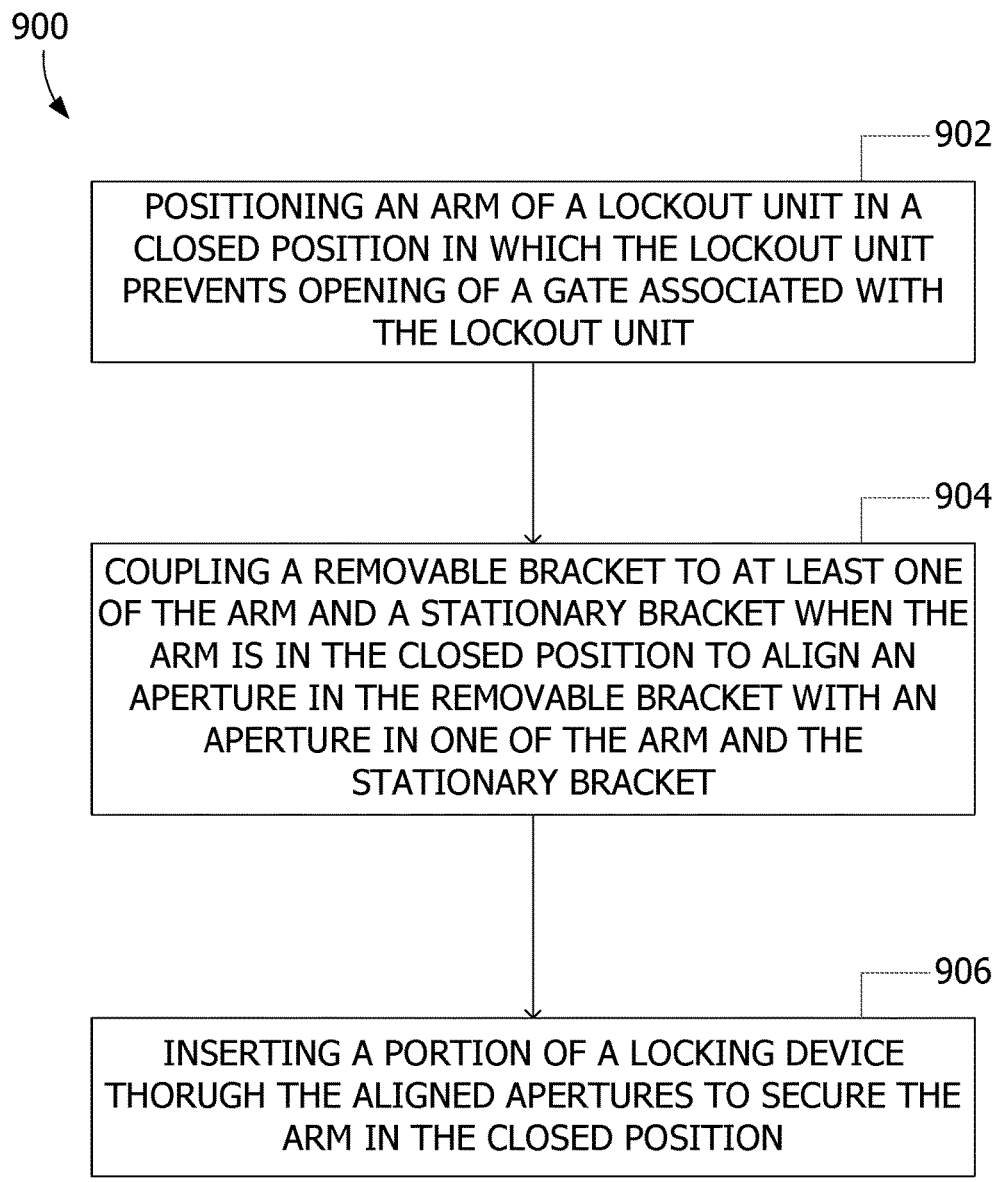
FIG. 9 is a flow diagram of an exemplary method that may be implemented to secure a bracket assembly in a closed configuration and that may be used with the system shown in FIG. 1.

FIG. 9 is a flow diagram of an exemplary method 900 for preventing access through a gate using a gate lockout system (e.g., system 100, shown in FIG. 1). The gate provides selective access to an electrical machine. The electrical machine has a maintenance mode and at least one other operating mode (e.g., a normal operating mode). The gate lockout system includes a lockout unit coupled to the gate. The lockout unit includes a stationary bracket including a first aperture defined therein, an arm including a second aperture defined therein, and a removable bracket including a third aperture defined therein. In some embodiments, method 900 includes additional, fewer, or alternative steps, including those described elsewhere herein.

In some embodiments, a lockout circuit of the lockout unit is determined to be inactive. Inactivity of the lockout circuit may be caused by, for example, malfunctions, worn components, and/or maintenance on the lockout circuit. In some embodiments, the lockout circuit is automatically determined to be inactive using a monitoring system (not shown) monitoring the lockout circuit. In other embodiments, the lockout circuit is manually determined to be inactive (e.g., a maintenance worker tests the lockout circuit).

To prevent access to the machine, such as when the lockout circuit is inactive, the arm is positioned 902 in a closed position. In at least some embodiments, the arm is positioned 902 in the closed position irrespective of whether or not the lockout circuit is inactive. When the arm is in the closed position, the lockout unit prevents opening of the gate. In one example, when the arm is moved to the closed position, the lockout unit is configured to cause a latch bolt to extend within or through a latch strike of the gate and secure the gate in a closed position. The removable bracket is coupled 904 to at least one of the arm and the stationary bracket when the arm is in the closed position to align the third aperture with one of the first and second apertures. In some embodiments, the removable bracket includes one or more pins that are coupled to one of the arm and the stationary bracket. In certain embodiments, the removable bracket includes a retaining member that defines a retaining opening. In such embodiments, the arm or the stationary bracket is inserted in the retaining opening to couple to the removable bracket. A portion of a locking device is inserted 906 through the third aperture and the aligned one of the first and second apertures to secure the arm in the closed position. While the arm is secured in the closed position, the lockout unit continues to prevent opening of the gate.

In at least some embodiments, when the arm is moved to the open position, a lockout circuit switches the electrical machine from a normal operating mode to the maintenance mode. In one example, the lockout unit causes the latch bolt of the gate to decouple from the latch strike when the arm is in the open position and enables the gate to be opened. The first and second apertures are aligned when the arm is in the open position such that the locking device is inserted through the first and second apertures to secure the arm in the open position. By securing the arm in the open position, the electrical machine remains in the maintenance mode. While the machine is in maintenance mode, a maintenance worker or other user accesses the machine. After the user has finished accessing the machine, the user removes the locking device from the arm and the stationary bracket and positions 902 the arm in the closed position. The lockout unit, in response to the arm moving to the closed position, switches the machine from the maintenance mode to a different operating mode.

The foregoing systems and methods facilitate improved safety of lockout systems used to provide selective access to electrical machines. The bracket assemblies described above facilitate securely locking a lockout unit in a particular configuration to prevent electrical machines from prematurely exiting a maintenance mode or to prevent users from accessing the electrical machines when the maintenance mode is not active. In some embodiments, for example, a bracket assembly includes a removable bracket that is selectively coupleable to an arm or stationary bracket of a lockout unit. The removable bracket facilitates maintaining the arm of the lockout unit in a closed position such that a gate coupled to the lockout unit cannot be opened. The removable bracket includes an aperture that is aligned with an existing aperture in the arm or the stationary bracket such that a locking device (e.g., a padlock) can be inserted through the apertures, and lock the bracket assembly in a closed configuration, thereby preventing the gate from being opened. The bracket assembly can thus be used with existing lockout units to secure the lockout units in a closed position or configuration with little to no modification of existing lockout units.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for preventing access through a gate using a lockout unit coupled to the gate, the lockout unit including a stationary bracket including a first aperture defined therein, an arm including a second aperture defined therein, and a removable bracket including a third aperture defined therein, said method comprising:

positioning the arm in a closed position in which the lockout unit prevents opening of the gate;

coupling the removable bracket to at least one of the arm and the stationary bracket when the arm is in the closed position to align the third aperture with one of the first aperture and the second aperture;

inserting a portion of a locking device through the third aperture and the aligned one of the first aperture and the second aperture to secure the arm in the closed position;

moving the arm to an open position such that the second aperture is substantially concentrically-aligned with the first aperture, wherein moving the arm to the open position switches an electrical machine associated with the gate from a normal operating mode to a maintenance mode; and inserting the portion of the locking device through the first aperture and the second aperture such that the locking device secures the arm in the open position.

2. The method in accordance with claim 1, wherein coupling the removable bracket to at least one of the arm and the stationary bracket comprises coupling at least one non-removable pin of the removable bracket to one of the arm and the stationary bracket.

3. The method in accordance with claim 1, wherein coupling the removable bracket to at least one of the arm and the stationary bracket comprises inserting one of the stationary bracket and the arm in a retaining opening defined by a retaining member of the removable bracket.

* * * * *